INVENTOR
JOSEPH H. GAMBLE

July 29, 1958  
J. H. GAMBLE  
2,845,622  
DIRECTION SENSITIVE RADIO SYSTEM  
Filed Nov. 13, 1953  
3 Sheets-Sheet 3

INVENTOR  
JOSEPH H. GAMBLE  
BY  
Thomas M. Ferrill, Jr.  
ATTORNEY

United States Patent Office 2,845,622
Patented July 29, 1958

2,845,622

DIRECTION SENSITIVE RADIO SYSTEM

Joseph H. Gamble, Plainville, Conn., assignor to Sperry Rand Corporation, a corporation of Delaware Application November 13, 1953, Serial No. 391,931

15 Claims. (Cl. 343—16)

This application is a continuation-in-part of application Ser. No. 283,660, filed April 22, 1952, now abandoned.

The present invention relates to direction sensitive antenna systems, and in particular to improved antenna structures especially adapted for use in monopulse type radar systems.

It has long been recognized that the best angular tracking accuracy for a radar system may be obtained by comparing received target echoes derived from overlapping receptivity patterns or lobes. Some of the first double lobe radar systems employed non-simultaneous, sequential comparison, and suffered inaccuracy because of changes in amplitude or magnitude of the received target echoes caused by glint, fading, or changes in system gain which occur in the intervals between comparison. For example, if the overlapping lobes are produced by the mechanical oscillation of an antenna, the time interval between the comparison of the magnitudes of the up and down received energy samples is quite long compared with radar time intervals. The answer to this difficulty is the simultaneous lobing or monopulse system. One such system of this type is disclosed in application Ser. No. 201,780, of Walter W. Mieher, entitled Monopulse Radar System, filed December 20, 1950, and assigned to the same assignee as the present application. This type of system compares the magnitudes of the up and down, or left and right received energy samples at the same time.

The prior art monopulse radar systems have employed a plurality of antennas or antenna feeds each simultaneously receiving portions of the reflected target echoes. The position of a selected target relative to the pointing direction of the antenna system determines the relative distribution of the received target energy over the apertures of the separate antennas or antenna feeds. The target energies collected by the separate antennas are supplied to a hybrid junction or junctions, such as the "magic tee," where they are combined to form the sum of the received energies from all of the antennas, and the difference of the received energies from certain pairs of the antennas. The position of the selected target relative to the pointing direction of the antenna system is determined by comparing the sum signal from the hybrid junction or junctions with the difference signals. The position of the target in azimuth and elevation relative to the pointing direction of the antenna system may be displayed on a suitable indicator and the antenna system may be arranged to automatically track the selected target by suitable auxiliary equipment well known in the art.

It has been difficult in these prior art systems to manufacture and align the plurality of antennas and their associated wave guide components to the tolerances required for the high tracking accuracy desired in the monopulse radar system. At ultra-high frequencies, small errors in physical dimensions of the associated wave guide components result in appreciable phase shift changes since such dimensional errors may be an appreciable portion of one cycle of the ultra-high-frequency energy. Therefore, in taking the sum and differences of ultra-high-frequency energies, it may be necessary to employ adjustable ultra-high-frequency phase shifters to correct for the phase errors which are unavoidably present in these prior monopulse systems. These phase shift corrections may differ between systems of the same type and manufacture, and thus become tedious and time consuming to make. Moreover, the directional accuracy of the antenna system can be adversely affected by phase shift errors caused by improper alignment and adjustment of the plurality of antennas and their associated components.

Accordingly, a principal object of the present invention is to provide a new and improved radar tracking system of the monopulse type which does not possess these problems and difficulties.

Another object of the invention is to provide a new and improved direction sensitive antenna system.

Yet another object of the present invention is to provide an improved simultaneous lobing radar system possessing increased directional tracking accuracy.

Still another object of the present invention is to provide a simplified and lightweight simultaneous lobing radar system.

In accordance with the present invention, there is introduced an improved monopulse radar system employing an antenna structure having a first directive antenna, and a second directive antenna mounted within the first antenna. An electromagnetic energy phase changing device is situated within the mouth of the first antenna. This phase changing device provides different amounts of phase shift along different radial directions from the directive axis of the antenna structure. Accordingly, electromagnetic energy passing therethrough undergoes a phase change dependent upon its angular position about the directive axis. In one embodiment of the invention, the phase changing device introduces a phase delay varying linearly according to the angle about the directive axis, and produces 360° of electrical phase delay for one revolution about the directive axis. Electromagnetic energy passes directly into the mouth of the second antenna and is not altered in phase. In a preferred embodiment of the invention, the first and second directive antennas are concentric and are used as antenna feeds in conjunction with a microwave lens. Electromagnetic pulses of energy are transmitted from the second antenna feed through the microwave lens and are radiated into space. Reflected pulses of energy from a target pass through the lens and are distributed over the mouths of the concentric antenna feeds. First and second receivers are coupled to the first and second antenna feeds respectively, and the relative phase difference between received target energy collected by the first and second antenna feeds is determined by first and second phase comparators. The position of the target in space in azimuth and elevation relative to the pointing direction of the lens and antenna feed assembly appears as an error voltage at the output of each phase comparator, and these error voltages are applied to apparatus for orienting the pointing direction of the antenna system to track the target.

The above objects of and the brief introduction to the present invention will be more fully understood and further objects and advantages will become apparent from a careful study of the following detailed description in connection with the drawings, wherein:

Fig. 3 illustrates a block diagram of the improved monopulse radar system of the present invention;

Figure 1:
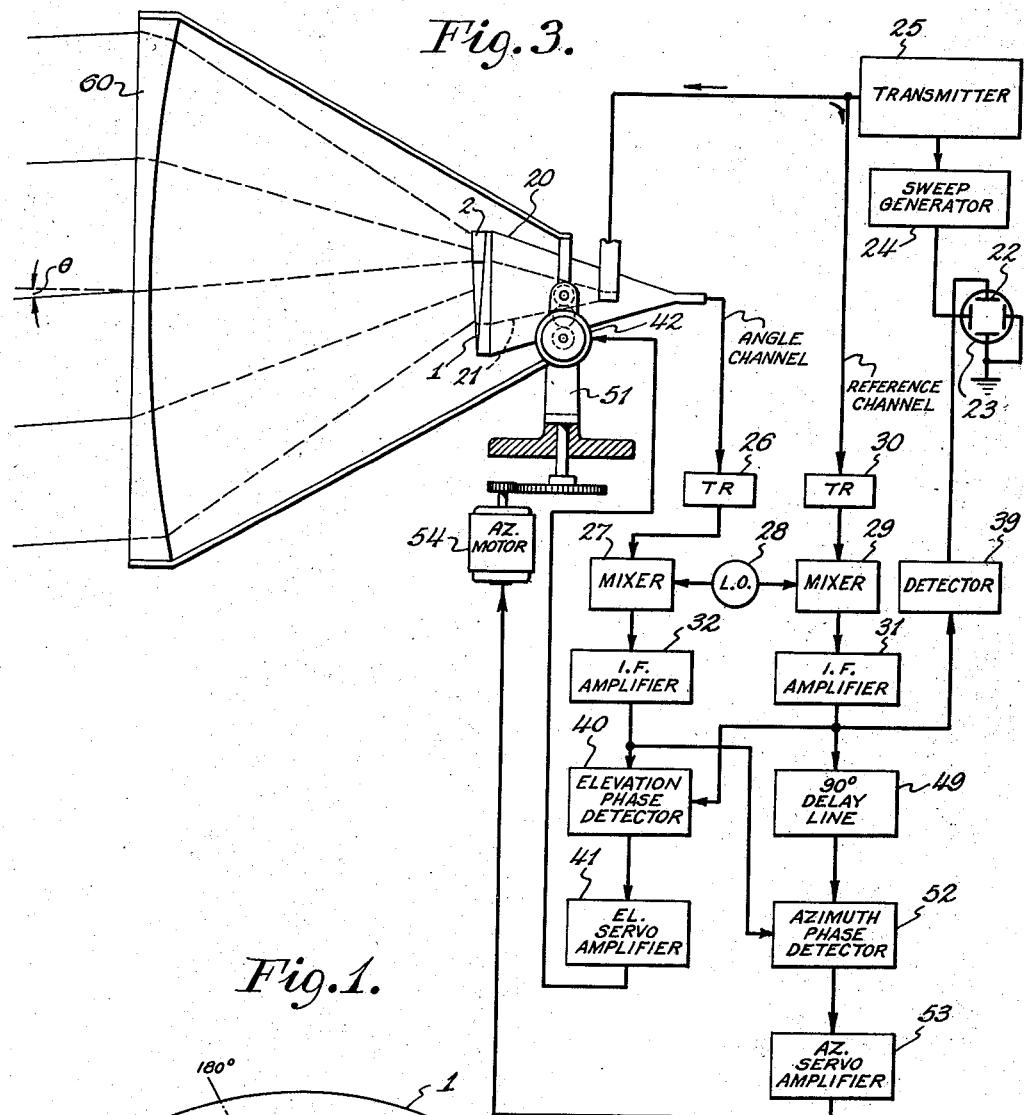
Fig. 1 shows a perspective view of an annular phase changing device used in the antenna system of the present invention.

Referring to Fig. 1, an annular phase delay device 1 is formed of suitable dielectric material as shown. The device is provided with a step 2 having a rise equal in height to that necessary to produce 360 degrees or one wavelength of phase shift of microwave energy passing therethrough. The device has a constant thickness along a radial line, and the thickness increases linearly from the bottom of step 2 to the top of step 2 as the angle $\phi$ increases about the axis of the device.

Figure 2:
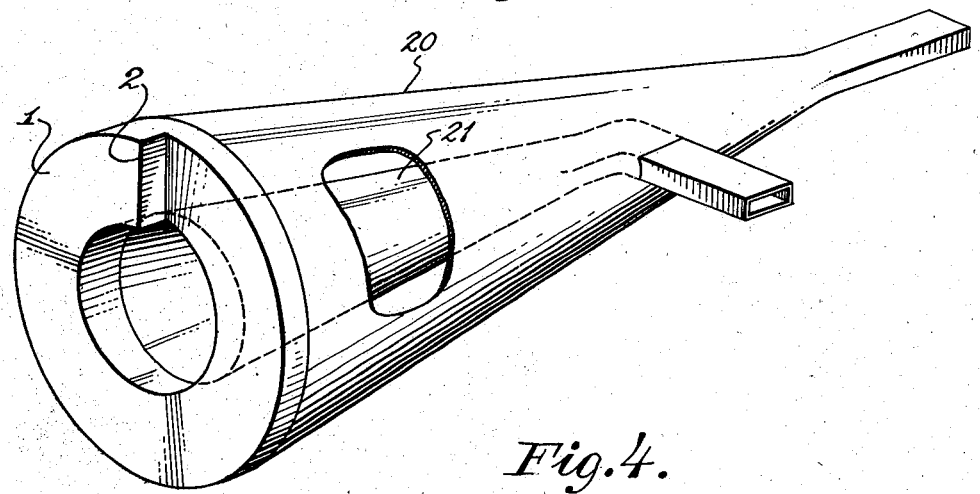
Fig. 2 is a perspective view of the horn antenna feed assembly for the antenna system of the present invention.

The annular delay device 1 is situated at the mouth of a horn antenna 20 as shown in Fig. 2. Concentrically mounted within horn 20 is a horn 21 having a mouth coinciding with the opening in the annular phase delay device 1. Microwave energy passing through the annular phase delay device 1 and entering horn 20 is delayed in phase by different amounts along different radial directions from the longitudinal axis of the horn assembly, while the microwave energy passing through the opening in the delay device 1 enters directly into horn 21 without phase delay. In the preferred embodiment of the invention, the microwave energy passing through device 1 is delayed in phase linearly according to the angle about the axis of the horn assembly relative to the step 2.

The horn assembly illustrated in Fig. 2 is employed in conjunction with a lens 60, in the preferred embodiment of the invention, as shown in Fig. 3. The antenna assembly is mounted within yoke 51, and is adapted to be directed in both azimuth and elevation. The mouth of the horn assembly 20, 21 is situated near the focal point of the lens 60, and the directive axis of the horn assembly coincides with the directive axis of the lens 60.

A conventional radar transmitter 25 supplies pulses of energy to the inner horn 21, and these pulses of energy are radiated by the antenna system into space. Reflected energy from a target in space is collected by the lens 60, and focused and distributed over the mouth of the horn assembly 20, 21 as will be more fully explained hereinafter. A portion of the reflected target energy passes through the mouth of horn 21 and through the T.-R. box 30 into mixer 29 of the reference channel, while another portion of the reflected energy passes through the phase delay device 1 into the horn 20 and to mixer 27 of the angle channel through T.-R. box 26. The T.-R. boxes 26 and 30 prevent transmitter energy from damaging mixers 27 and 29 respectively. The received target energy supplied to mixer 27 is heterodyned with energy from local oscillator 28 in accordance with conventional superheterodyne practice, and the difference frequency signal from mixer 27 is amplified by I.-F. amplifier 32 and supplied to the elevation phase detector 40 and to the azimuth phase detector 52. Similarly, the energy supplied to mixer 29 is heterodyned with energy from local oscillator 28, and the difference frequency signal from the mixer 29 is amplified by the I.-F. amplifier 31. The amplified output voltage from I.-F. amplifier 31 is supplied directly to the elevation phase detector 40, and through a 90-degree delay line or phase shifter 49 to the azimuth phase detector 52. The mixers 27 and 29, and the I.-F. amplifiers 31 and 32 may be of the type as shown and described in the aforesaid patent application Ser. No. 201,780.

Elevation phase detector 40 compares the phase of the amplified signal from I.-F. amplifier 32 with the phase of the signal from I.-F. amplifier 31, and produces an output error control voltage that is dependent upon the elevation of a target relative to the elevation pointing direction of the antenna assembly. The azimuth phase detector 52 compares the phase of the amplified signal from I.-F. amplifier 32 with the phase of the signal from I.-F. amplifier 31 as shifted by the 90-degree phase shifter 49, and accordingly, produces an error control output voltage which varies according to the azimuth of a target relative to the azimuth pointing direction of the antenna system. The elevation error control voltage is amplified by the elevation servo amplifier 41, and applied to the elevation servomotor 42 to position the pointing direction of the antenna system in elevation toward the target in space. Similarly, the azimuth error control voltage from the azimuth phase detector 52 is amplified by azimuth servo amplifier 53 and supplied to azimuth servomotor 54 for positioning the pointing direction of the antenna system in azimuth toward the target in space.

A sweep generator 24 coupled to the transmitter 25 produces a sweep voltage synchronized with the repetition frequency of the radar pulses, and the sweep voltage is supplied to a horizontal deflection plate of cathode-ray tube 23. The output signal from I.-F. amplifier 31 in the reference channel is detected by detector 39 and supplied to vertical deflection plate 22 of the cathode-ray tube 23. The cathode-ray tube 23 provides a simple indication of the target and its range in accordance with conventional A-scope presentation.

The phase of the received microwave energy at the output of horn 20 as supplied to the angle channel is determined according to the position of the target in space relative to the pointing direction of the antenna system in a manner now to be described. Where the target in space is situated on the pointing axis of the antenna system, and where the reflected target energy arrives at the antenna system parallel to its pointing axis, the reflected energy is symmetrically distributed over the mouth of the concentric horn assembly 20, 21 relative to the common center of these horns. The maximum concentration of energy is located at the common center of the horn assembly and a reduced amount of energy is present near the edges of the mouth of the horn assembly. For this condition, the distribution of received energy is as illustrated in Fig. 4a where the front view of the annular phase delay device 1, as mounted in the horns 21, 20, is shown, and where the step 2 lies in a vertical plane. The distribution of received energy is indicated by a plurality of marks dotted over the mouths of the horns 20, 21 within the broken-line circle 3. The greatest concentration of microwave energy lies within the broken-line circle 3 with the maximum concentration at is center. For purposes of illustration, the microwave energy is illustrated as being confined within the broken-line circle 3 while in actual practice there is always some energy existing outside of this circle 3.

For the above example, with the received target energy symmetrically distributed about the center of the mouth of the horn assembly, horn 20 produces zero or a null output signal. This may be explained by referring to the vector diagram of Fig. 4b where the vectors OA through OH represent equal portions of received target energy that have passed through the phase delay device 1 into the horn 20 along different radial lines. The vector OA, for example, represents the phase and magnitude of a portion of received target energy that has passed through the phase delay device 1 along a radial line extending from the center of device 1 through the step 2. The vector OA may arbitrarily be designated as a reference vector, and the radial line extending from the center of the phase delay device 1 through step 2 may be designated as a reference radial line. The vector OB represents the phase and magnitude of another portion of received target energy equal in magnitude to that portion represented by vector OA that has passed through phase delay device 1 along a 45 degree angle measured clockwise from the reference radial line. Accordingly, this portion of energy is delayed in phase relative to the portion of energy represented by vector OA by 45 electrical degrees since this energy has traversed a greater thickness of the dielectric phase delay device 1. Similarly, the vector OE represents a portion of energy within horn 20 which has been delayed in phase by 180 degrees relative to vector OA. Since the portions of energy at the output of horn 20 represented by vectors OA and OE are equal in magnitude and opposite in phase, their resultant is zero. This is true for vectors OB and OF as well as for any pair of vectors extending outward from the center O of the vector diagram in opposite directions. Therefore, the vector sum or resultant of all the vectors of Fig. 4b is zero as is illustrated in Fig. 4c.

For the example where a target in space is situated directly below the pointing direction of the antenna assembly by an angle $\theta$, as illustrated in Fig. 3, the resultant target energy at the output of horn 20 is not zero as in the above illustrated case. Reflected energy from the target directly below the pointing direction of the antenna assembly is collected by lens 60 and distributed over the mouth of the horn assembly 20, 21 as is illustrated in Fig. 4d. For this distribution of received target energy, a much larger portion of energy passes through the phase delay device 1 along the reference radial line than for the condition where the target was situated on the pointing axis of the antenna assembly, and a very small portion of energy passes through the phase delay device along radial lines extending downward from the center of the mouth of the horn assembly 20, 21. Accordingly, a new vector diagram as shown in Fig. 4e illustrates the phase condition of the received target energy at the output of the horn 20, wherein the vectors OA through OH correspond to those of Fig. 4b. The vector OA of Fig. 4e has the same direction as previously described but its magnitude is larger since it represents a greater portion of energy passing through the phase delay device along the reference radial line. Likewise, the vector OB represents energy passing through the phase delay device along a radial line 45 degrees to the right of the reference radial line, and its length is slightly longer than in the previous example since a larger portion of energy is passing through the device 1 along the 45 degree radial line. However, the portions of energy represented by vectors OD and OF are considerably smaller in magnitude than in the previous example. Therefore, the vector sum or resultant of all of the vectors in Fig. 4e is a vector R as shown in Fig. 4f, and the direction of this vector coincides with the direction of vector OA, since the largest portion of received target energy passing through the phase delay device 1 is along the reference radial line.

For the example where a target in space is situated above and to the right of the pointing direction of the antenna assembly by equal distances, the distribution of reflected target energy over the mouth of the horn assembly 20, 21 is as illustrated in Fig. 4g. For this distribution, the largest amount of energy passes through the phase delay device 1 along a radial line that is 135 degrees measured clockwise from the reference radial line as represented by the vector diagram of Fig. 4h. The vector OD has the greatest length, and, accordingly, the sum or resultant of all of the vectors is a resultant vector R as illustrated in Fig. 4i. The length of the vector R of Fig. 4i is illustrated as being approximately equal to the length of the vector R of Fig. 4f, while the direction of the resultant vector R in Fig. 4i is 135 degrees to the right of the resultant vector R of Fig. 4f. Therefore, the phase of the received target energy at the output of the horn 20 is delayed in phase by 135 degrees relative to the phase of the received target energy as represented by the resultant vector R of Fig. 4f.

For all of the above examples, the energy received by the inner horn 21 has not undergone any phase change, and, accordingly, is supplied to the reference channel where it serves as the reference signal.

The system of Fig. 3 is initially adjusted for proper target tracking by first pointing and holding the antenna assembly toward a selected reference target in azimuth and slightly above the selected target in elevation such that reflected target energy is received from below the pointing direction of the antenna system, as for example by an angle $\theta$ as previously described. The azimuth phase detector 52 should produce a null output signal voltage under this condition while the elevation phase detector 40 should produce an appreciable output error control voltage. Proper alignment is obtained by rotating the angular position of the phase delay device 1 about its axis until the error control output voltage from elevation phase detector 40 becomes a maximum and the error control output voltage from azimuth phase detector 52 becomes a minimum.

Figure 4:
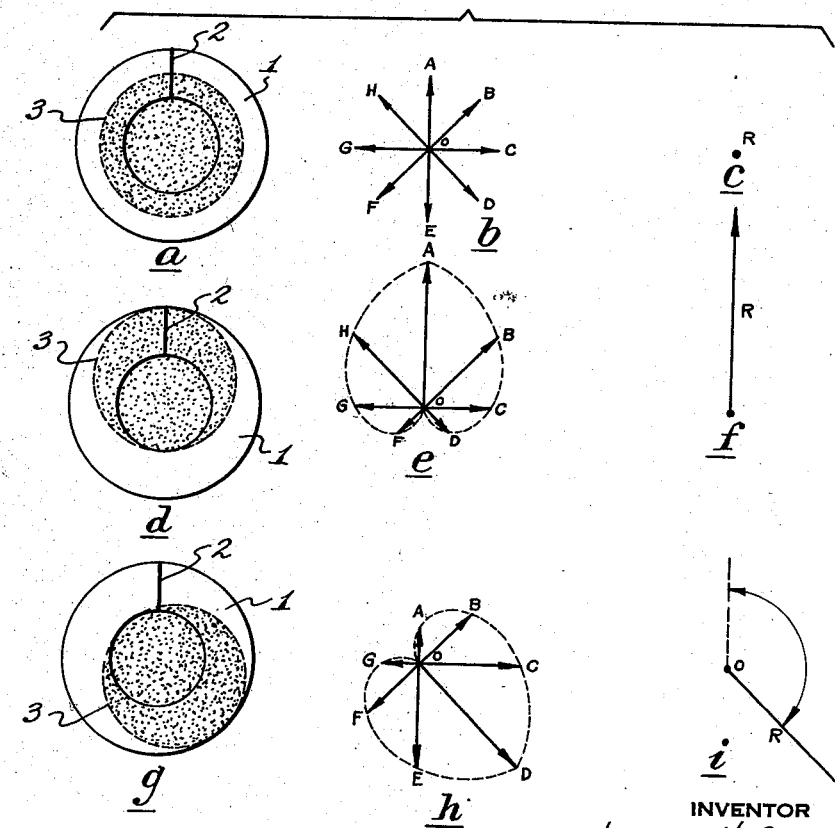
Figs. 4a through 4i show several different views of the distribution of received microwave energy over the mouth of the horn antenna feed assembly of Fig. 2 together with corresponding vector diagrams illustrating the combining action of microwave energy within the outer horn member.

Another procedure that may be employed is to leave the phase delay device 1 in the angular position shown in Figs. 2 and 4, and insert a conventional microwave variable phase shifter just ahead of T.-R. box 30 for adjusting the phase shift of the reference signal passing therethrough. The phase shifter is adjusted to produce a maximum output error control voltage from elevation detector 40 while a minimum or zero output error control voltage is produced from azimuth phase detector 52. The polarity of the elevation error control voltage as amplified by elevation servo amplifier 41 is such that the elevation servomotor 42 is energized to rotate in the proper direction to move the pointing direction of the antenna assembly in elevation toward the target, thereby reducing the error control voltage at the output of elevation phase detector 40 as in conventional tracking systems.

The lens 60 is designed with a focal length and an aperture which is suitable for producing a distribution of received target energy over the mouth of the horn assembly 20, 21 as illustrated in the Figs. 4a, 4d, and 4g. The choice of focal length of this lens is a factor in determining the angular tracking accuracy and sensitivity of the system since a target but slightly off the pointing direction of the antenna system can cause an appreciable shift in the distribution of received target energy over the mouth of the horn assembly 20, 21 because of the lever action of the lens 60.

Figure 5:
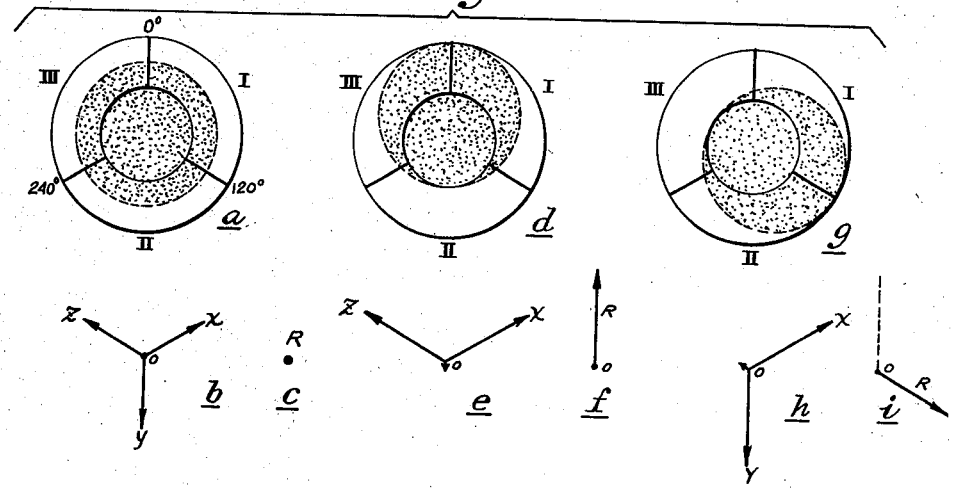
Figs. 5a through 5i show several other views of the distribution of received microwave energy over the mouth of an alternative horn antenna feed assembly together with corresponding vector diagrams.

An alternative embodiment to the phase delay device of Fig. 1 which is useful in the antenna structure of the present invention is an annular delay device having three equal-angular sectors of dielectric material as shown in Fig. 5a, wherein each sector has a constant thickness and the difference in thickness between adjacent sectors is such as to produce a difference in phase delay of the microwave energy passing through adjacent sectors of 120 electrical degrees. For example, in Fig. 5a the sector I extending from zero to 120 degrees may possess a thickness equal to that necessary for producing a phase delay of 60 degrees of the received target energy passing therethrough. The thickness of sector II extending from 120 degrees to 240 degrees is such as to delay the phase of the received target energy passing therethrough by 120 degrees relative to the energy passing through sector I. Sector III, extending from 240 degrees to zero degrees, introduces an additional phase delay of 120 electrical degrees of the energy passing therethrough relative to the phase of the energy that has traversed sector II.

For the condition where a target in space is situated on the pointing axis of the antenna system and reflects energy parallel to the pointing axis, the received target energy is distributed symmetrically over the mouth of the alternative dielectric delay means about its center as shown in Fig. 5a in the same manner as previously explained in connection with Fig. 4a. The phase and amplitude of the received target energy passing through the three sectors of this phase delay device may be illustrated by the vector diagram of Fig. 5b. Vector OX represents the portion of energy that has passed through sector I of the dielectric delay device, and, accordingly, has undergone a phase delay of 60 degrees. Vector OY represents another portion of received target energy that has traversed sector II and has undergone an additional phase delay of 120 electrical degrees relative to vector OX. Similarly, the vector OZ represents still another portion of received target energy that has traversed sector III, and its direction indicates an additional phase delay of 120 degrees with respect to the vector OY. For this distribution of energy, the sum or resultant of the vectors of Fig. 5b is zero as represented in Fig. 5c. Accordingly, the output energy from horn 20 is zero corresponding to the condition as explained heretofore in connection with Fig. 4a.

For the condition where the target in space is situated below the pointing direction of the antenna system, the reflected target energy is distributed over the mouth of the alternative delay device in a manner as illustrated in Fig. 5d. For this condition, a greater portion of energy passes through sectors I and III than in the previous case, and a very small portion of energy traverses sector II as indicated in Fig. 5e. The sum or resultant of the vectors for this distribution of received target energy is the vector R as illustrated in Fig. 5f. This resultant vector R corresponds to the resultant vector R of Fig. 4f in the previous example, since the position of the target in space corresponds identically thereto.

For the condition where the target in space is above and to the right of the pointing direction of the antenna assembly, the received target energy may be distributed over the mouth of the alternative delay device as shown in Fig. 5g. The vector diagrams illustrated as Figs. 5h and 5i are associated with this distribution, and the resultant vector R of Fig. 5i is delayed in phase relative to the resultant vector R of Fig. 5f in a similar manner as taught heretofore in connection with Fig. 4f and Fig. 4i.

The alternative annular phase delay device is not limited to three equal-angular sectors but may be constructed to possess any number of equal-angular sectors provided the difference in phase delay through adjacent sectors expressed in electrical degrees multiplied by the number of sectors is equal to 360 degrees.

Figure 6:
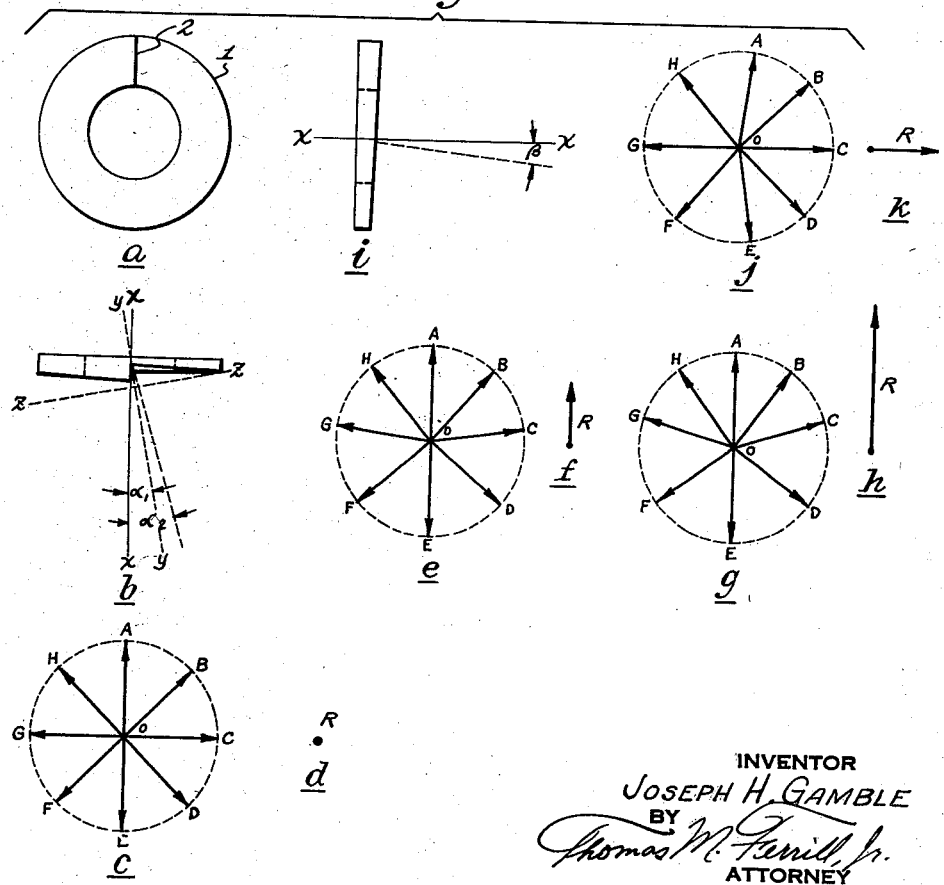
Figs. 6a through 6k illustrate an alternative mode of operation of the horn antenna assembly of Fig. 2 including diagrams useful in explaining the principle of operation.

The present invention may be arranged to operate on a different principle than heretofore described, wherein the lens 60 is removed, and the horn assembly 20, 21 together with delay device 1, as illustrated in Fig. 2, is used directly as the antenna structure. This alternative principle of operation may be explained by referring to Figs. 6a through 6k. Fig. 6a shows a front view of the delay device 1 of the alternative antenna system, and Fig. 6b shows a top view. The longitudinal or directive axis of the alternative antenna assembly is shown as a line x—x passing through the center of the top view.

For the condition where the target in space is situated on the directive axis x—x of the alternative antenna system, reflected target energy arrives at the mouth of the antenna assembly along rays parallel to the directive axis x—x, and is uniformly distributed over the entire mouth of the antenna structure. The received target energy at the output of horn 20, for this condition, is zero as was the case previously taught in connection with Figs. 4a, 4b, and 4c. This is illustrated in Fig. 6c, wherein the vectors OA through OH represent different portions of energy that have passed through delay device 1 along different radial lines. The magnitudes of the portions of energy are equal but the phase delay of each portion of energy is different along different radial directions. The sum or resultant of all these portions of energy at the output of horn 20 is zero as illustrated in Fig. 6d.

However, when the target in space is situated in azimuth to the left of the pointing direction of the alternative antenna system, as long line y—y at an angle α1 as shown in Fig. 6b, reflected target energy will arrive at the mouth of the antenna assembly along rays parallel to line y—y. The phase front of this received energy, which is perpendicular to the direction of propagation as represented by line z—z, will arrive at one side of the delay device 1 sooner than its arrival at the other side of the delay device 1. Accordingly, the received target energy passing through the right side of the delay device of Fig. 6b will arrive at the output of horn 20 sooner than the energy which passes through the delay device on the opposite side, since it has a shorter distance to travel. The portions of energy that pass through the phase delay device 1 in a vertical plane extending through the center of the device and through step 2 will arrive at the output of horn 20 at the same time as though the selected target was directly on the pointing axis of the antenna system since the portions of energy have the same distance to travel. The phase and magnitude of the energy at the output of horn 20, therefore, may be represented by the vector diagram of Fig. 6e, wherein the vectors OA through OH are of equal length as before, but their directions are different than for the condition where the selected target is directly on the pointing axis of the antenna system. For example, the direction of vector OB, which represents a portion of energy that passes through the phase delay device along the radial line extending at a 45 degree angle from the reference radial line, extends in a direction that is less than 45 degrees from the direction of vector OA since the portion of energy represented by OB will arrive at the output of horn 20 sooner than if the selected target was situated directly on the pointing axis of the antenna system. The phase delay of the portion of energy represented by OB of Fig. 6e for this condition is, accordingly, less than the phase delay of the portion of energy represented by vector OB of Fig. 6c. The vector OC representing the portion of energy which traverses the phase delay device 1 along a radial line extending 90 degrees relative to the reference radial line, as well as the energy represented by vector OD, also will arrive at the output of horn 20 sooner than for the case where the selected target is situated directly on the pointing axis of the antenna system. Conversely, the vectors OF, OG, and OH represent portions of energy which traverse the delay device 1 to the left of line y—y as viewed in Fig. 6b, and these portions of energy will arrive at the output of horn 20 later than for the condition where the selected target is directly on the pointing axis of the antenna system. The sum or resultant of the vectors illustrated in Fig. 6e is represented as a resultant vector R of Fig. 6f, and its direction represents the phase of the energy at the output of horn 20.

Where the selected target in space is situated in azimuth at an angle α2 greater than the angle α1 as in the above case, portions of energy passing through the right side of the phase delay device 1 of Fig. 6b will arrive at the output of horn 20 even sooner than for the above condition, and the energy passing through the opposite side of the phase delay device 1 will arrive at the output of horn 20 even later than for the above described condition. The phase of the energy at the output of horn 20 for this condition is represented by Fig. 6g wherein the vectors OB, OC and OD are delayed in phase less than the case illustrated in Fig. 6e, and the vectors OF, OG and OH are delayed in phase more than the case illustrated in Fig. 6e. The sum or resultant of these vectors is the resultant vector R of Fig. 6h. The direction of this resultant vector is the same as the direction of the resultant vector R of Fig. 6f, and its magnitude is greater than the magnitude of vector R of Fig. 6f. Thus, the magnitude of the resultant vector R varies according to the displacement of the target in azimuth relative to the pointing axis of the antenna.

For the condition where the target in space is situated directly below the pointing axis of the alternative antenna system, and reflected target energy arrives at the mouth of phase delay device 1 at an angle β below the directive axis x—x of the antenna system, as in Fig. 6i illustrating the delay device 1 as viewed from the left side, the distribution of received target energy that traverses device 1 is represented by the vectors OA through OH of Fig. 6j. For this condition, the sum or resultant of the vectors OA through OH is shown at Fig. 6k as a resultant vector R extending in a direction perpendicular to the resultant vector R of Fig. 6f and Fig. 6h. Thus, the phase of the output energy from horn 20 varies according to the angular position of a target in space relative to the pointing direction of the alternative antenna assembly.

The energy received by horn 21 passes directly through the opening in device 1 without phase change, and is supplied as a reference signal to the reference channel of the radar system of Fig. 3 as explained heretofore. The phase comparison system of Fig. 3 as previously taught may be used with the alternative horn antenna assembly 20, 21 only with one minor alteration. Since the direction of resultant vector R of Figs. 6f, 6h, and 6k, representing the output energy from horn 20, is displaced 90 degrees relative to the resultant vector R of Figs. 4f and 4i for the same position of a target in space relative to the pointing axis of the antenna system, it is necessary to remove the 90-degree phase shifter 49 from between I.-F. amplifier 31 and azimuth phase detector 52, and insert it instead between I.-F. amplifier 32 and elevation phase detector 40. The system may then be aligned to track a selected target in space using the same adjustment procedure as described heretofore in connection with Fig. 3.

The aperture of the horn assembly 20, 21 may be chosen to be considerably larger when used as the alternative antenna structure than when used as a horn feed system as in Fig. 3 to insure that the alternative antenna structure may have a high angular sensitivity.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave antenna system comprising first and second coaxial conical electromagnetic horns having substantially coplanar mouths, and an annular dielectric phase delay device coaxially mounted in front of the mouth of the outer horn and outside the mouth of the inner horn, said phase delay device having different thicknesses in different radial directions from the axis of said device for delaying the phase of incident electromagnetic energy distributed over the surface of and passing through said device, the electromagnetic energy passing through a first radial element of said device being delayed by a first phase value, the electromagnetic energy passing through a second radial element of said device being delayed by a second phase value, the difference between said first and second phase values varying according to the angle between said first and second radial elements.

2. An antenna system comprising a first directive antenna means, a phase delay means situated in front of said first antenna means, said phase delay means including means for delaying the phase of incident electromagnetic energy distributed over the surface thereof and passing therethrough, the electromagnetic energy passing through a first radial element of said phase delay means being delayed by a first phase value, the electromagnetic energy passing through a second radial element of said phase delay means being delayed by a second phase value, the difference between said first and second phase values varying according to the angle between said first and second radial elements, and a second directive antenna means coaxially mounted with respect to said first antenna means, said second antenna means being adapted for receiving incident electromagnetic energy substantially without phase delay.

3. A microwave antenna system comprising first and second coaxial conical electromagnetic horns having substantially coplanar mouths, and an annular dielectric phase delay device coaxially mounted in front of the mouth of the outer horn and outside the mouth of the inner horn, said phase delay device delaying the phase of incident electromagnetic energy distributed over the surface thereof and passing therethrough, the electromagnetic energy incident upon the surface of said device along a first radial line perpendicular to the axis of said device being delayed by a first phase value in passing therethrough, the electromagnetic energy incident upon the surface of said device along a second radial line perpendicular to the axis of said device being delayed by a second phase value in passing therethrough, the difference between said first and second phase values varying linearly according to the angle between said first and second radial lines.

4. A direction sensitive antenna system comprising a first directive antenna means responsive to incident electromagnetic energy, electromagnetic energy phase changing means situated in the path of said incident electromagnetic energy and along the directive axis of said first directive antenna means, said phase changing means introducing a phase shift of the electromagnetic energy distributed over the surface thereof and passing therethrough, the electromagnetic energy incident upon the surface of said phase changing means along a first radial line perpendicular to the directive axis of said first antenna means being delayed by a first phase value in passing therethrough, the electromagnetic energy incident upon the surface of said phase changing means along a second radial line perpendicular to the directive axis of said first antenna means being delayed by a second phase value in passing therethrough, the difference between said first and second phase values varying according to the angle between said first and second radial lines, and second directive antenna means situated along the directive axis of said first antenna means, said second directive antenna means being directly responsive to said incident electromagnetic energy without phase shift along different radial lines from said directive axis.

5. A direction sensitive antenna system comprising a first directive antenna means responsive to incident electromagnetic energy, electromagnetic energy phase changing means situated in the path of said incident electromagnetic energy and along the directive axis of said first directive antenna means, said phase changing means introducing a phase shift of the electromagnetic energy distributed over the surface thereof and passing therethrough, the electromagnetic energy incident upon the surface of said phase changing means along a first radial line perpendicular to the directive axis of said first antenna means being delayed by a first phase value in passing therethrough, the electromagnetic energy incident upon the surface of said phase changing means along a second radial line opposite from said first radial line being delayed by a second phase value, the difference between said first and second phase values lying between 120 and 240 electrical degrees inclusive, and a second directive antenna means situated along the directive axis of said first antenna menas and rigidly mounted with respect to said first antenna means, the directive axis of said second antenna means coinciding with the directive axis of said first antenna means, said second directive antenna means being directly responsive to said incident electromagnetic energy without phase shift along different radial lines from said directive axis.

6. The direction sensitive antenna system as defined in claim 5 wherein the difference between said first and second phase values is substantially 180 electrical degrees.

7. An antenna system comprising a first waveguide horn, a second waveguide horn mounted within and spaced apart from said first waveguide horn, the longitudinal axis of said second waveguide horn coinciding with the longitudinal axis of said first waveguide horn, the apertures of said first and second waveguide horns lying in a common plane, and an annular microwave dielectric delay means coaxially mounted in the mouth of said first waveguide horn, the aperture in said annular delay means surrounding the mouth of said second horn, said annular delay means having a constant thickness along a radial line and having different thicknesses in different radial directions from said longitudinal axis, the thickness of said dielectric delay means varying linearly from a first value along a first radial line perpendicular to said longitudinal axis to a second value along a second radial line perpendicular to said longitudinal axis according to the angle between said first and second radial lines.

8. The antenna system as defined in claim 7 wherein the difference in thickness between said first and second values is substantially equal to the value required to produce a phase delay of microwace energy passing through said dielectric delay means substantially equal to 360 electrical degrees corresponding to an angular difference between said first and second radial lines equal to 360 degrees.

9. An antenna system comprising a directive antenna means including first and second coaxially disposed antenna horns, a phase delay means situated in front of said first antenna horn, said phase delay means including means for delaying the phase of incident electromagnetic energy passing therethrough and entering said first antenna horn, and a lens mounted in front of and spaced apart from said phase delay means for focussing rays of incoming electromagnetic energy to form an image upon a portion of the surface of said phase delay means, the position of said image of electromagnetic energy varying over the surface of said phase delay means according to the angle of arrival of the electromagnetic energy entering said lens relative to the directive axis of said antenna system, the phase delay of the electromagnetic energy passing through said phase delay means varying as the center of said image of electromagnetic energy moves over the surface of said phase delay means about said directive axis, the electromagnetic energy passing therethrough being delayed by a first phase value as the center of said image of electromagnetic energy coincides with a first radial line extending perpendicular to said directive axis and being delayed by a second phase value as the center of said image of electromagnetic energy coincides with a second radial line extending perpendicular to said directive axis, the difference between said first and second phase values varying according to the angle between said first and second radial lines.

10. A radar system comprising an antenna means including a first directive antenna, an electromagnetic energy phase changing means situated in the path of incident electromagnetic energy to be received by said first directive antenna, said phase changing means including means for altering the phase of incident electromagnetic energy distributed over the surface thereof and passing therethrough, the electromagnetic energy passing through a first radial element of said phase changing means being delayed by a first phase value, the electromagnetic energy passing through a second radial element of said phase changing means being delayed by a second phase value, the difference between said first and second phase values varying according to the angle between said first and second radial elements, a second directive antenna coaxially mounted with respect to said first directive antenna, said second directive antenna being adapted to receive electromagnetic energy without phase alteration along different radial directions from said directive axis, transmitter means coupled to said second directive antenna, first receiver means coupled to said first directive antenna, second receiver means coupled to said second directive antenna, first phase comparator means coupled to the outputs of said first and second receiver means, and second phase comparator means coupled to the outputs of said first and second receiver means, said first phase comparator means producing an output signal varying according to the elevation of a target relative to the pointing direction of said antenna means, and said second phase comparator means producing an output signal varying according to the azimuth of a target relative to the pointing direction of said antenna means.

11. A radar tracking system comprising an antenna means including a first waveguide horn, a second waveguide horn mounted with respect to said first waveguide horn, the longitudinal axis of said second waveguide horn coinciding with the longitudinal axis of said first waveguide horn, a microwave energy delay means situated in front of the mouth of said first waveguide horn and outside the mouth of said second waveguide horn, said delay means having different thicknesses in different radial directions from the longitudinal axis of said waveguide horns for delaying the phase of incident electromagnetic energy distributed over the surface thereof and passing therethrough, the electromagnetic energy incident upon the surface of said delay means along a first radial line perpendicular to said longitudinal axis being delayed by a first phase value in passing therethrough, the electromagnetic energy incident upon the surface of said delay means along a second radial line perpendicular to said longitudinal axis being delayed by a second phase value in passing therethrough, the difference between said first and second phase values varying according to the angle between said first and second radial lines, transmitter means coupled to said second waveguide horn, first receiver means coupled to said first waveguide horn, second receiver means coupled to said second waveguide horn, first phase comparator means coupled to the outputs of said first and second receiver means, and second phase comparator means coupled to the outputs of said first and second receiver means, said first phase comparator means producing an output signal varying according to the elevation of a target relative to the pointing direction of said antenna means, and said second phase comparator means producing an output signal varying according to the azimuth of a target relative to the pointing direction of said antenna means.

12. A radar system comprising a first directive microwave antenna means, a second directive microwave antenna means rigidly mounted with respect to said first antenna means and spaced apart therefrom, the pointing direction of said second antenna means substantially coinciding with the pointing direction of said first antenna means, said first and second antenna means being movable for varying said pointing direction in azimuth and elevation, a microwave phase delay means situated in front of said first antenna means, said phase delay means delaying the phase of microwave energy passing therethrough and exciting said first antenna means, the microwave energy incident upon the surface of said phase delay means along a first radial line perpendicular to the directive axis of said first antenna means being delayed by a first phase value in passing therethrough, the microwave energy incident upon the surface of said phase delay means along a second radial line perpendicular to the directive axis of said first antenna means being delayed by a second phase value in passing therethrough, the difference between said first and second phase values varying according to the angle between said first and second radial lines, transmitter means coupled to said second antenna means, first receiver means coupled to said first antenna means, second receiver means coupled to said second antenna means, first phase comparator means coupled to the outputs of said first and second receiver means, and second phase comparator means coupled to the outputs of said first and second receiver means, said first phase comparator means producing an output voltage varying according to the azimuth of a target relative to the directive axis of said first and second antenna means, and said second phase comparator producing an output signal varying according to the elevation of a target relative to the directive axis of said first and second antenna means.

13. An antenna system comprising a directive antenna means having a maximum response to a plane polarized electromagnetic wave entering said antenna means along its directive axis, the plane of polarization of said wave being perpendicular to said directive axis, and an electromagnetic phase delay means mounted in front of said directive antenna means and in the path of said electromagnetic wave, the directive axis of said antenna means passing through the center of said phase delay means, said phase delay means and said directive antenna providing an antenna system having a minimum response to a plane polarized electromagnetic wave entering said antenna system along said directive axis, the portion of said electromagnetic wave incident upon said phase delay means along a first radial line perpendicular to said directive axis being delayed by a first phase value in passing therethrough and entering said antenna means, the portion of said electromagnetic wave incident upon said phase delay means along a second radial line perpendicular to said directive axis being delayed by a second phase value in passing therethrough and entering said antenna means, the difference between said first and second phase values varying according to the angle between said first and second radial lines, both the maximum phase difference between said first and second phase values and the angle between said first and second radial lines being substantially 360 degrees.

14. Inner and outer coaxial microwave horns, an annular microwave delay means mounted coaxially with said horns, the aperture of said delay means being equal to the aperture of said inner horn.

15. A pair of coaxial microwave horns and a ring shaped microwave delay means of varying thickness, the aperture of said delay means being coaxial with and equal to the aperture of the inner of said horns.

References Cited in the file of this patent

UNITED STATES PATENTS

| | | |
|---|---|---|
| 2,418,156 | Bollman | Apr. 1, 1947 |
| 2,423,104 | Labin | July 1, 1947 |
| 2,425,488 | Peterson et al. | Aug. 12, 1947 |
| 2,429,601 | Biskeborn et al. | Oct. 28, 1947 |
| 2,438,343 | McClellan | Mar. 23, 1948 |
| 2,459,117 | Oliver | Jan. 11, 1949 |
| 2,480,829 | Barrow et al. | Sept. 6, 1949 |
| 2,510,692 | Goddard | June 6, 1950 |
| 2,571,129 | Hansen | Oct. 16, 1951 |
| 2,585,173 | Riblet | Feb. 12, 1952 |
| 2,663,848 | Lewis | Dec. 22, 1953 |
| 2,682,656 | Phillips | June 29, 1954 |

FOREIGN PATENTS

| | | |
|---|---|---|
| 604,772 | Great Britain | July 9, 1948 |